(12) United States Patent
Plattner (10) Patent No.: US 7,401,626 B1
(45) Date of Patent: Jul. 22, 2008

(54) LOW AIR INCLUSION QUICK DISCONNECT COUPLING

(76) Inventor: Wesley M. Plattner, 1146 Breyman Hwy., Tipton, MI (US) 48287

( * ) Notice: Subject to any disclaimer, the term of this patent is extended or adjusted under 35 U.S.C. 154(b) by 470 days.

(21) Appl. No.: 10/991,328

(22) Filed: Nov. 18, 2004

(51) Int. Cl.
*F16L 37/28* (2006.01)

(52) U.S. Cl. .............................. 137/614.03; 137/614.05

(58) Field of Classification Search ............ 137/614.03, 137/614.04, 614.05
See application file for complete search history.

(56) References Cited

U.S. PATENT DOCUMENTS

| | | | |
|---|---|---|---|
| 2,451,218 A | 10/1948 | Hengst | |
| 2,457,251 A * | 12/1948 | Main, Jr. | 137/614.04 |
| 3,199,831 A | 8/1965 | Sully | |
| 3,417,781 A | 12/1968 | Gregg | |
| 3,994,317 A | 11/1976 | Miyazaki et al. | |
| 4,327,770 A * | 5/1982 | Brown et al. | 137/614.03 |
| 4,637,432 A | 1/1987 | Medvick et al. | |
| 5,080,132 A | 1/1992 | Manz et al. | |
| 5,103,868 A * | 4/1992 | Wilkins | 137/614.03 |
| 5,211,197 A | 5/1993 | Marrison et al. | |
| 5,215,122 A | 6/1993 | Rogers et al. | |
| 5,293,902 A | 3/1994 | Lapierie | |
| 5,592,970 A * | 1/1997 | Stucchi et al. | 137/614.03 |
| 5,791,366 A | 8/1998 | Lo | |
| 6,024,124 A | 2/2000 | Braun et al. | |
| 6,158,717 A | 12/2000 | Van Scyoc et al. | |
| 6,669,168 B2 | 12/2003 | Scheffel | |

* cited by examiner

*Primary Examiner*—Kevin L Lee
(74) *Attorney, Agent, or Firm*—Young Basile (57) ABSTRACT

A fluid line coupling apparatus comprising a first enclosure and a second enclosure. The first enclosure has a first passageway extending therethrough and a piston slidably disposed therein. The piston is movable between a closed position, wherein the first passageway is blocked by the piston, and an open position, wherein the first passageway is not blocked by the piston. The second enclosure has a second passageway extending therethrough and a collar slidably disposed therein. The collar is movable between the closed position, wherein the second passageway is blocked by the collar, and the open position, wherein the second passageway is not blocked by the collar. The first and second enclosures are engageable such that the front surface of the piston and the front surface of the collar lie in a substantially common plane when the piston and the collar are in their closed position.

15 Claims, 5 Drawing Sheets

LOW AIR INCLUSION QUICK DISCONNECT COUPLING

FIELD OF THE INVENTION

The present invention relates to the field of quick disconnect couplings, and more particularly, the present invention relates to a quick disconnect coupling having a male and female coupling member that provide a quick disconnect for pressurized fluid transfer lines while preventing the introduction of air into the pressurized fluid transfer lines upon coupling.

BACKGROUND OF THE INVENTION

Quick disconnect couplings often provide complementary male and female coupling members that engage one another to provide sealed fluid transmission across the interface of two separate fluid transmission lines. Both the male and female coupling members of such quick disconnect couplings typically provide valves that close when the coupling is in an uncoupled state such that the fluid is sealed within the fluid transmission lines. It has been known to use compression springs to force such valves shut when the coupling is in its uncoupled state.

In many applications, it is desirable to minimize the amount of ambient air that is introduced into the fluid transmission lines upon engaging the male and female coupling members. Ambient air may be introduced into the fluid transmission lines, for example, when the male coupling member enters a cooperatively sized recess in the female coupling member and thereby traps ambient air inside the quick disconnect coupling.

It would be desirable to provide a quick disconnect coupling that prevented air from being trapped inside the coupling during engagement and provided a securing means that quickly connected and disconnected the coupling.

BRIEF SUMMARY OF THE INVENTION

The present invention provides a fluid line coupling apparatus for providing a quick disconnect for pressurized fluid transfer lines that prevents the introduction of air into the pressurized fluid transfer lines upon coupling and uncoupling. The present invention provides a first enclosure and a second enclosure, wherein each of the first and second enclosures is attachable with a fluid line at its rear end and engageable with the other enclosure at its front end. The first enclosure and the second enclosure cooperate to define a closed position of the apparatus wherein fluid may not flow between the first enclosure and the second enclosure, and an open position of the apparatus, wherein fluid may flow between the first enclosure and the second enclosure.

The first enclosure has a first passageway extending therethrough and a first piston slidably disposed therein. The first piston is movable between the closed position, wherein the first piston blocks the first passageway, and the open position, wherein the first piston does not block the first passageway, thereby allowing fluid to flow therethrough. The first enclosure also provides a sleeve that is held in a fixed position with respect to the first enclosure. The second enclosure has a second passageway extending therethrough and a collar slidably disposed therein. The collar is movable between a closed position, wherein the collar blocks the second passageway, and an open position, wherein the collar does not block the second passageway, thereby allowing fluid to flow therethrough. The second enclosure also provides a second piston held in a fixed position with respect to the second enclosure.

The first and second enclosures may engage one another by having a front surface of the first piston, a front surface of the collar, a front surface of the second piston, and a front surface of the sleeve lie in a first substantially common plane when the first piston and the collar are in the closed position. When the first piston and the collar are in the open position, the front surface of the first piston and the front surface of the second piston lie in a second substantially common plane, and the front surface of the collar and the front surface of the sleeve lie in a third substantially common plane.

BRIEF DESCRIPTION OF THE DRAWINGS

The description herein makes reference to the accompanying drawings wherein like referenced numerals refer to like parts throughout several views and wherein.

DETAILED DESCRIPTION OF THE INVENTION

Referring to the drawings, the present invention will now be described in detail with reference to the preferred embodiment.

Figure 1:
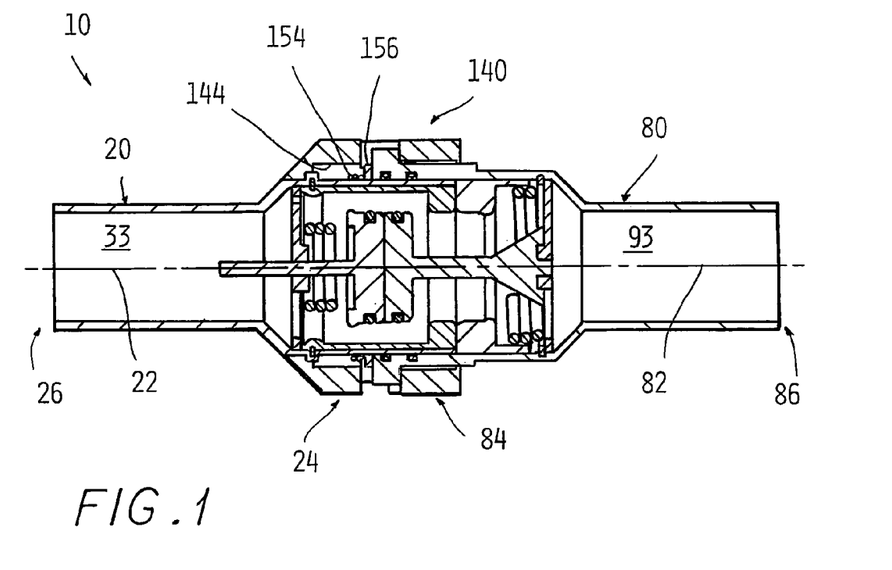
FIG. 1 is a sectional view of the quick disconnect coupling of the present invention.

FIG. 1 shows a low air inclusion quick disconnect apparatus 10 of the present invention. The apparatus 10 provides a male coupling member 20 and a female coupling member 80 that releasably engage one another to provide a quick disconnect feature of the apparatus 10. The apparatus 10 provides an open position, wherein the male coupling member 20 and the female coupling member 80 engage one another to allow for the flow of fluid between the male coupling member 20 and the female coupling member 80, and a closed position, wherein the fluid may not flow between the male coupling member 20 and the female coupling member 80. The male coupling member 20 has a longitudinal axis 22, a front end 24 that engages the female coupling member 80, and a rear end 26 that is engageable with a fluid transmission line (not shown). A first passageway 33 extends through the male coupling member 20 between the front end 24 and the rear end 26. The female coupling member 80 is similar to the male coupling member 20 in that the female coupling member 80 has a longitudinal axis 82, a front end 84 that engages the male coupling member 20, and a rear end 86 that is engageable with a fluid transmission line (not shown). A second passageway 93 extends through the female coupling member 80 between the front end 84 and the rear end 86. When the male coupling member 20 is connected to the female coupling member 80 in the open position, fluid is allowed to flow through the first and second passageways between the front ends of the coupling members 20, 80. A securing nut 140 secures attachment of the coupling members 20, 80 to one another.

Figure 2:
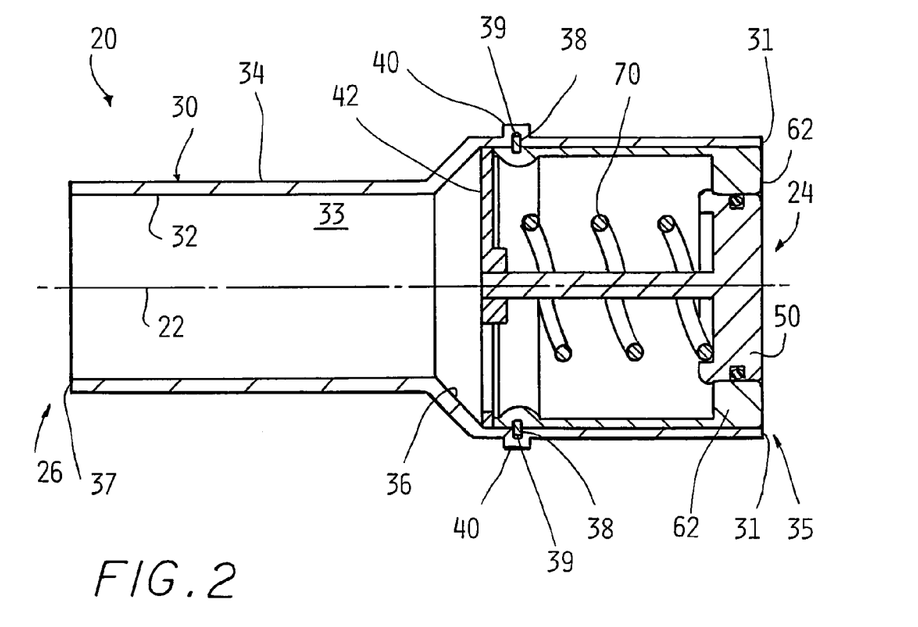
FIG. 2 is a sectional view of the male coupling member of the quick disconnect coupling of the present invention.

As shown in FIG. 2, the male coupling member 20 provides for the flow of fluid by having a first, substantially hollow enclosure 30 that has a front end 35 and a rear end 37. The first enclosure 30 has an inner bore 32 that defines the outer boundaries of the first passageway 33 extending through the first enclosure 30. The diameter of the inner bore 32 of the first enclosure 30 is smaller at the rear end 37 of the first enclosure 30 than at the front end 35 of the first enclosure 30. The inner bore 32 of the first enclosure 30 has a variable diameter created by a frustroconical taper 36 that is located midway along the first enclosure 30. The first enclosure 30 has an annular groove 38 in its inner bore 32 with a snap ring 39 seated therein. The first enclosure 30 also has an annular projection 40 on its outer surface 34 that retains the securing nut 140.

Figures 7, 8, 9, 10:
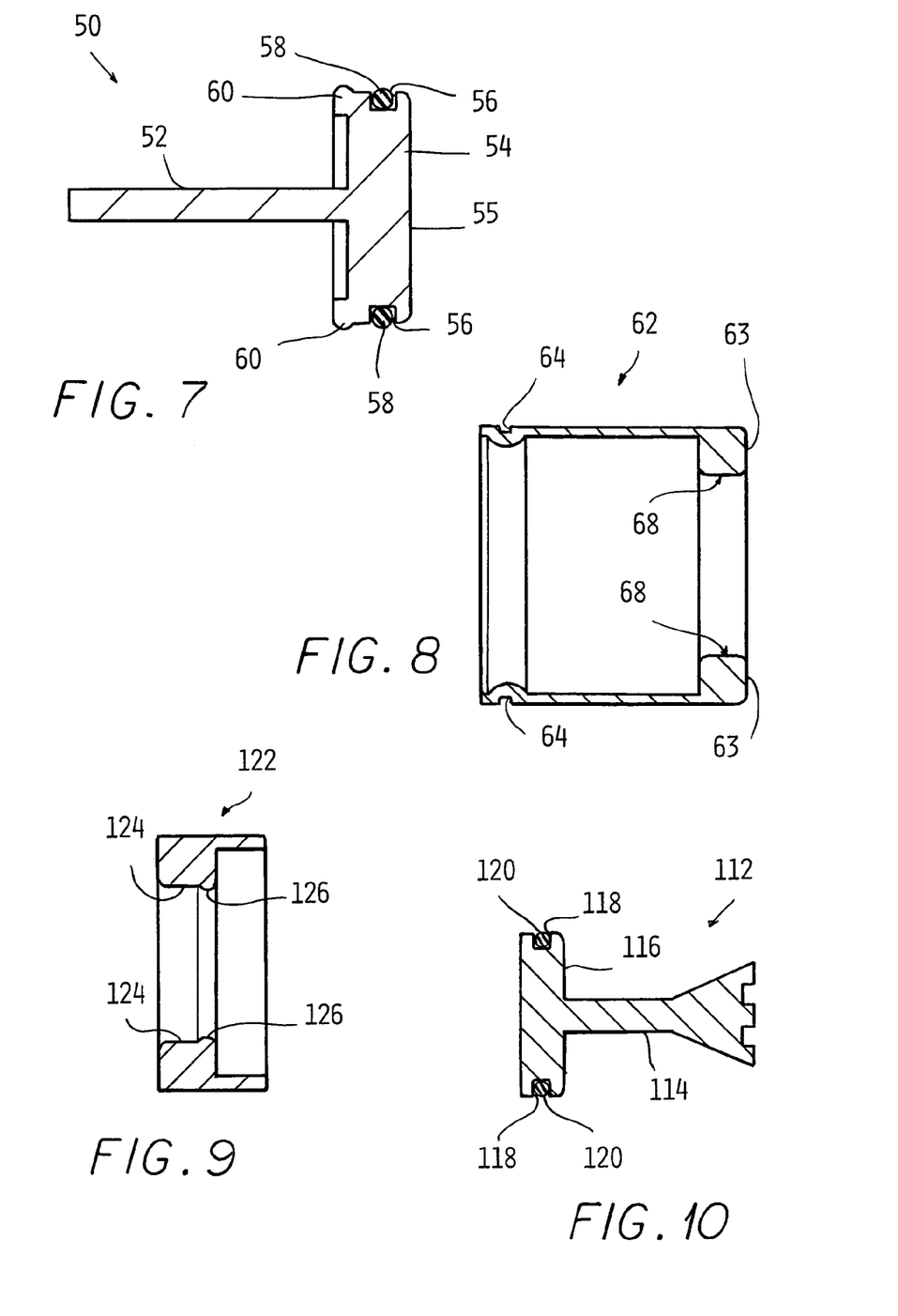
FIG. 7 is a sectional view of the male coupling member piston rod of the quick disconnect coupling of the present invention.
FIG. 8 is a sectional view of the male coupling member tubular sleeve of the quick disconnect coupling of the present invention.
FIG. 9 is a sectional view of the female coupling member collar of the quick disconnect coupling of the present invention.
FIG. 10 is a sectional view of the female coupling member piston rod of the quick disconnect coupling of the present invention.

For the purpose of opening and closing the first passageway 30, a piston rod 50 is slidably disposed within the first enclosure 30. As shown in FIGS. 2 and 7, the piston rod 50 extends along the longitudinal axis 22 of the male coupling member 20 and includes a substantially cylindrical piston head 54 attached to the front end of a stem portion 52. The piston head 54 has a groove 56 formed in its annular surface with an elastic o-ring 58 disposed in the groove 56 to seal the piston head 54 with respect to a tubular sleeve 62. Although the piston head 54 is substantially cylindrical, the area between the groove 56 and the rear end of the piston head 54 includes a widened portion 60 that engages the tubular sleeve 62 in order to retain the piston rod 50 inside the first enclosure 30 and seat the piston head 54 against the tubular sleeve 62 in the closed position, as seen in FIG. 2.

Figures 4, 5, 6:
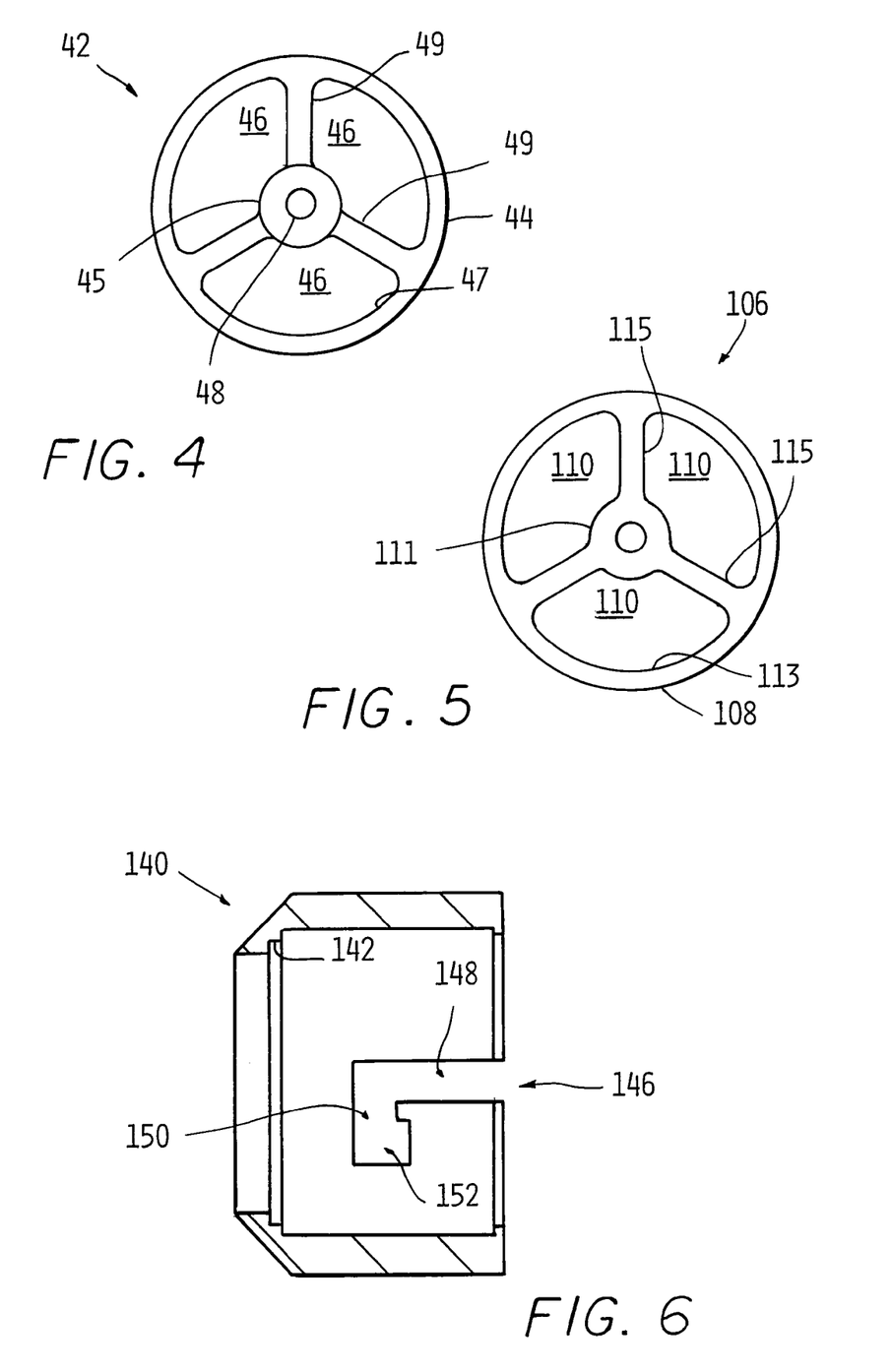
FIG. 4 is a plan front view of the male coupling member guide of the quick disconnect coupling of the present invention.
FIG. 5 is a plan front view of the female coupling member guide of the quick disconnect coupling of the present invention.
FIG. 6 is a sectional view of the securing nut of the quick disconnect coupling of the present invention.

To guide the motion of the piston rod 50 so that it travels along the longitudinal axis 22 of the first enclosure 30, a substantially disc shaped guide 42 is provided. An aperture 48 in the middle of the guide 42 receives the stem portion 52 of the piston rod 50 to guide the motion of the piston rod 50. The guide 42 is disposed within the first enclosure 30 adjacent to and frontward of the frustroconical taper 36. As best seen in FIGS. 2 and 4, the outer periphery 44 of the guide 42 provides a surface that complementarily engages the inner bore 32 of the first enclosure 30. The guide 42 is prevented from moving rearward since the diameter of the inner bore 32 of the first enclosure 30 at the frustroconical taper 36 is smaller than the diameter of the guide 42. Three apertures 46 extend through the guide 42 to allow fluid to flow past the guide 42. Each of the three apertures 46 has a first arcuate side 45 that is adjacent to the aperture 48 in the guide 42, a second arcuate side 47 that is adjacent to the outer periphery 44 of the guide 42, and two radial sides 49 extending radially along lines from the center of the guide 42 to the outer periphery 44 of the guide 42.

In the closed position, the piston head 54 engages the tubular sleeve 62 disposed within the first enclosure 30. As shown in FIGS. 2 and 8, the tubular sleeve 62 has an outer surface with a groove 64 formed therein. The snap ring 39 is received in the groove 64 in the tubular sleeve 62 and engages the groove 38 in the first enclosure 30, thereby holding the outer surface of the tubular sleeve 62 in a fixed position with respect to the first enclosure 30. The rear surface of the tubular sleeve 62 engages the guide 42, thereby securing the guide 42 in a fixed position between the tubular sleeve 62 and the frustroconical taper 36. In order to provide a surface that is complementary to the annular surface of the piston head 54 and is capable of sealingly engaging the piston head 54 and the elastic o-ring 58, the tubular sleeve 62 includes an annular projection 68 that extends inward from the inner surface of the tubular sleeve 62.

The piston rod 50 is biased toward the front end 24 of the male coupling member 20 by a first compression spring 70 such that the piston head 54 engages the annular projection 68 of the tubular sleeve 62, thereby blocking the passageway 33. The first compression spring 70 is disposed inside the tubular sleeve 62 and extends around the stem portion 52 of the piston rod 50 such that the first compression spring 70 may react to compressive forces along the longitudinal axis 22 of the male coupling member 20. The rearward portion of the first compression spring 70 engages the guide 42, and the forward portion of the first compression spring 70 engages the piston head 54.

In order to prevent the piston rod 50 from traveling out of the first enclosure 30 in reaction to the force of the first compression spring 70, the widened portion 60 of the piston head 54 is retained rearward of the annular projection 68 of the tubular sleeve 62. When the piston head 54 is in the closed position, a front surface 63 of the tubular sleeve 62 and a front surface 31 of the first enclosure 30 lie in a substantially common plane with a front surface 55 of the piston head 54. Upon application of a compressive force to the front surface 55 of the piston head 54 such that the biasing force of the first compression spring 70 is overcome, the piston rod 50 moves in a rearward direction such that the piston head 54 and the annular projection 68 disengage, thereby unblocking the passageway 33 and moving toward the open position.

Figure 3:
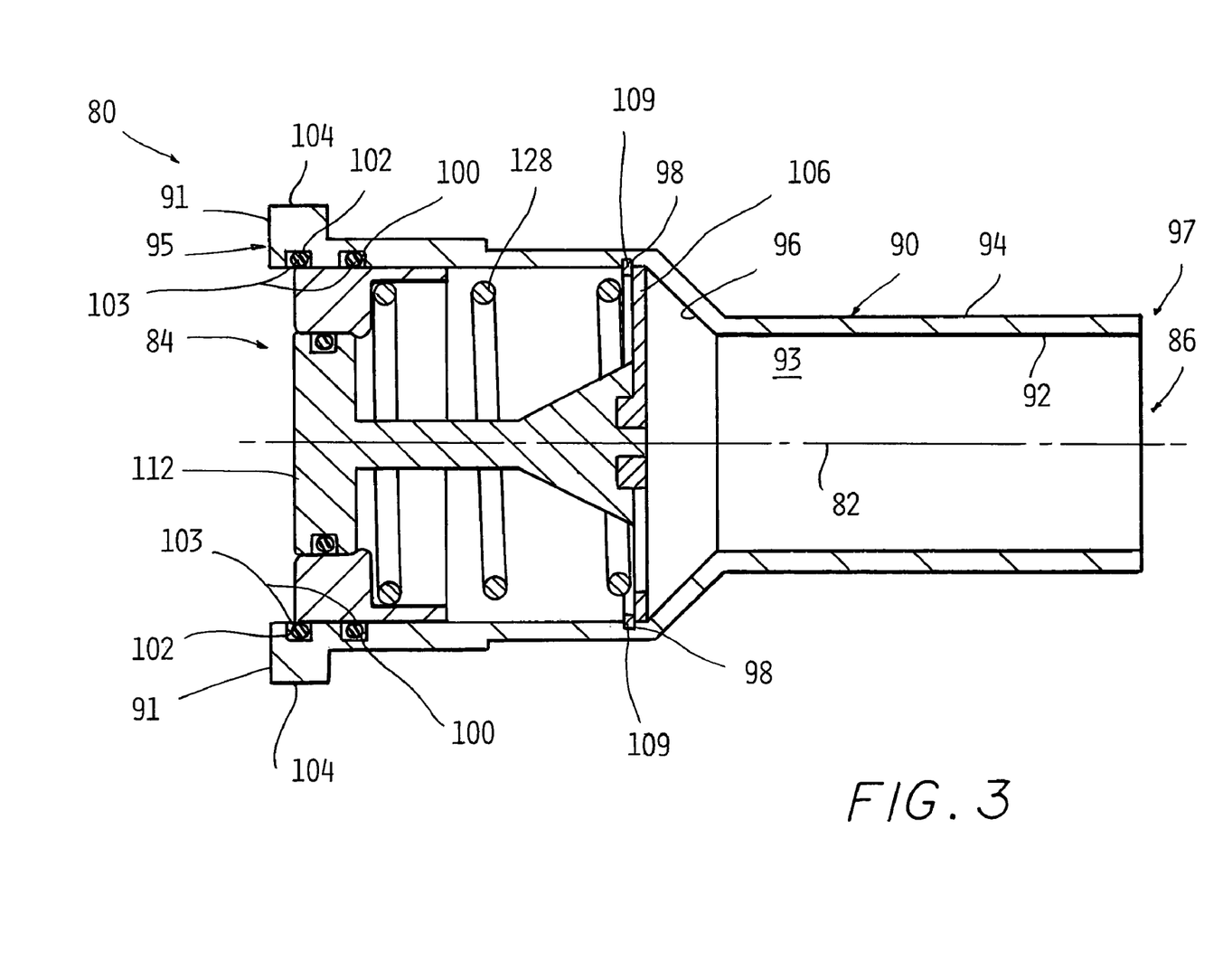
FIG. 3 is a sectional view of the female coupling member of the quick disconnect coupling of the present invention.

As shown in FIG. 3, the female coupling member 80 provides for the flow of fluid by having a second substantially hollow enclosure 90 that has a front end 95 and a rear end 97. The second enclosure 90 has an inner bore 92 that defines the outer boundaries of the second passageway 93 extending through the second enclosure 90. The diameter of the inner bore 92 of the second enclosure 90 is smaller at the rear end 97 of the second enclosure 90 than at the front end 95 of the second enclosure 90. The inner bore 92 of the second enclosure 90 has a variable diameter created by a frustroconical taper 96 that is located midway along the second enclosure 90. It is also seen that a first annular groove 98, a second annular groove 100, and a third annular groove 102 are formed in the inner bore 92 of the second enclosure 90. The first annular groove 98 is located proximal to and forward of the frustroconical taper 96. The second annular groove 100 and the third annular groove 102 are located forward of the frustroconical taper 96 and proximal to the front end 84 of the female coupling member 80. Elastic O-rings 103 are provided in each of the second annular groove 100 and the third annular groove 102 to provide a seal between the inner bore 92 of the second enclosure 90 and the outer surface 34 of the first enclosure 30 when the apparatus 10 is in the open position. The second enclosure 90 is also provided with a pair of projections 104 extending from the outer surface 94 of the second enclosure 90 proximal to the front end 84 of the female coupling member 80.

The second enclosure 90 includes a fixed piston rod 112 disposed within the second enclosure 90. As shown in FIGS. 3 and 10, the fixed piston rod 112 includes a stem portion 114 that extends along the longitudinal axis 82 of the female coupling member 80. A substantially cylindrical piston head 116 is attached to the front end of the stem portion 114 of the fixed piston rod 112. The piston head 116 has a groove 118 formed in its annular surface and an elastic o-ring 120 disposed therein for sealing the piston head 116 against a slidable collar 122.

In order to maintain the piston rod 112 in a fixed position with respect to the second enclosure 90, the piston rod 112 is attached to the center of a guide 106 that is disposed within the second enclosure 90. The guide 106 is substantially disc shaped and is held in a fixed position between the frustroconical taper 96 and a snap ring 109 that is seated in the first annular groove 98. As best seen in FIGS. 3 and 5, the outer periphery 108 of the guide 106 provides a surface that complementarily engages the inner bore 92 of the second enclosure 90. Fluid flow past the guide 106 is accommodated by three apertures 110 extending through the guide 106. Each of the three apertures 110 has a first arcuate side 111 that is adjacent to the center of the guide 106, a second arcuate side 113 that is adjacent to the outer periphery 108 of the guide 106, and two radial sides 115 that extend radially along lines from the center of the guide 106 to the outer periphery 108 of the guide 106.

To allow the apparatus 10 to move between the open and closed positions, the collar 122 is slidably disposed within the second enclosure 90. As shown in FIGS. 3 and 9, the outer surface of the collar 122 engages the inner bore 92 of the second enclosure 90. In order to provide a surface that is complementary to the annular surface of the piston head 116 and is capable of a sealing engagement with the piston head 116 and the elastic o-ring 120, the collar 122 has an annular projection 124 that extends inward from the inner surface of the collar 122. The rearward area of annular projection 124 includes a widened portion 126 that extends further inward from the collar 122.

The collar 122 is biased toward the front end 84 of the female coupling member 80 by a second compression spring 128 such that the annular projection 124 of the collar 122 engages the piston head 116, thereby blocking the second passageway 93 in the closed position. The second compression spring 128 is disposed inside the second enclosure 90 and extends around the stem portion 114 of the piston rod 112. The rearward portion of the second compression spring 128 engages the guide 106, and the forward portion of the second compression spring 128 engages the collar 122. The second compression spring 128 is disposed such that it may react to compressive forces acting along the longitudinal axis 82 of the female coupling member 80.

In order to limit the forward travel of the collar 122 in the female coupling member 80 in response to the biasing force of the second compression spring 128, the widened portion 126 of the collar 122 engages the piston head 116 and is thereby retained rearward of the piston head 116. When the collar 122 is in the closed position, a front surface 117 of the piston head 116 and a front surface 123 of the collar 122 lie in a substantially common plane, thereby blocking the second passageway 93. Upon application of a compressive force to the front surface 123 of the collar 122 such that the biasing force of the second compression spring 128 is overcome, the collar 122 will move in a rearward direction such that the piston head 116 and the annular projection 124 of the collar 122 will disengage toward the open position, so that the second passageway 93 is not blocked.

As seen in FIGS. 1 and 6, the securing nut 140 is rotatably disposed around the exterior of the first enclosure 30 of the male coupling member 20. The securing nut 140 includes a shoulder 142 formed on the inner surface of the securing nut 140 that engages the annular projection 40 of the first enclosure 30. Forward of the shoulder 142, the inner surface of the securing nut 140 is spaced-apart from the outer surface 34 of the first enclosure 30, thereby defining an annular slot 144. A compression spring 154 and a washer 156 are provided in the annular slot 144. The compression spring 154 engages the annular projection 40 at its rearward end and engages the washer 156 at its forward end to bias the washer 156 toward the front end 24 of the male coupling member 20. The securing nut 140 has two L-shaped slots 146 extending therethrough. Each of the two L-shaped slots 146 has a long axial leg 148, a circumferential leg 150, and a short axial leg in which projections 104 of the second enclosure 90 of the female coupling member 80 are retained in order to provide secure attachment of the male coupling member 20 with the female coupling member 80.

In order to attach the male coupling member 20 to the female coupling member 80, the front end 24 of the male coupling member 20 is presented to the front end 84 of the female coupling member 80 such that the front end 95 of the second enclosure 90 is substantially aligned with the annular slot 144. After the securing nut 140 is rotated with respect to the male coupling member 20 such that the projections 104 of the second enclosure 90 of the female coupling member 80 are aligned with the L-shaped slots 146 of the securing nut 140, the male coupling member 20 is free to move into the female coupling member 80.

Figure 11:
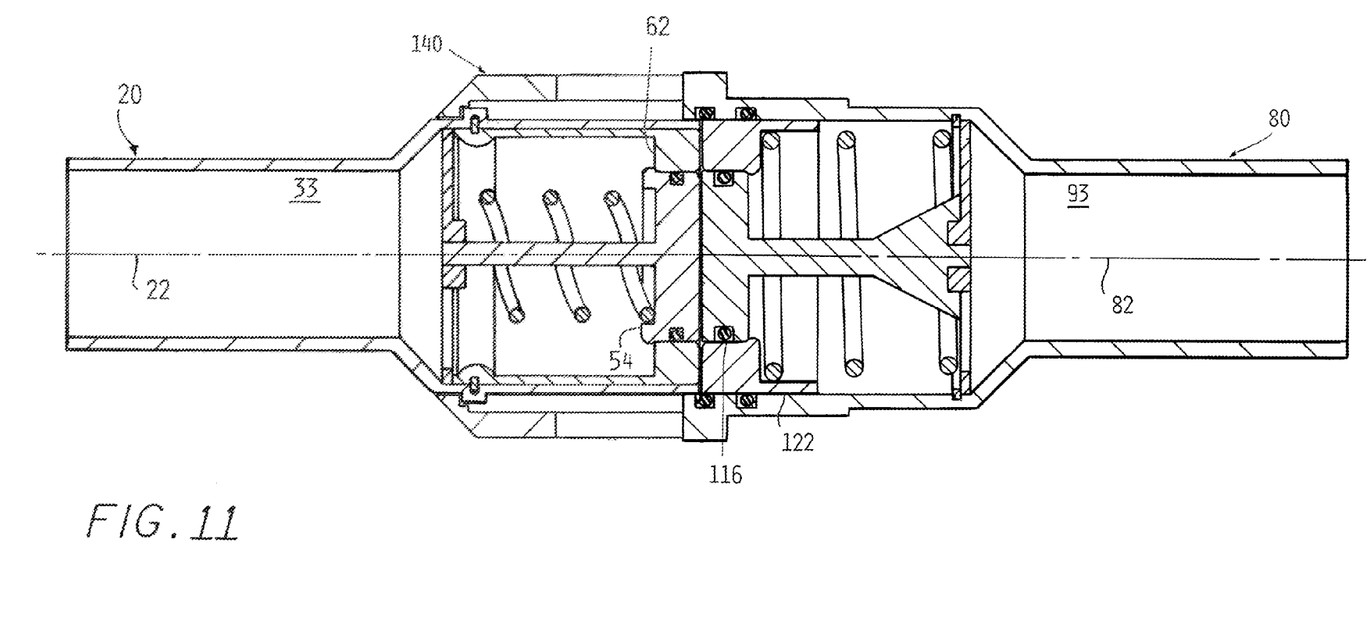
FIG. 11 is a sectional view of the quick disconnect coupling of the present invention, wherein the male coupling member engages the female coupling member and the quick disconnect coupling is in a closed position.

To prevent air from becoming trapped between the male coupling member 20 and the female coupling member 80, the male coupling member 20 initially engages the female coupling member 80 such that the front surface 55 of the piston head 54, the front surface 63 of the tubular sleeve 62, the front surface 117 of the piston head 116 and the front surface 123 of the collar 122 all lie in a first substantially common plane, as shown in FIG. 11. In this initial engagement or closed position, the slidable piston head 54 blocks the first passageway 33, and the collar 122 blocks the second passageway 93 such that the male and female coupling members 20, 80 are not in fluid communication.

As the first enclosure 30 enters the second enclosure 90, the outer surface 34 of the first enclosure 30 engages the elastic o-rings 103 in the second annular groove 100 and the third annular groove 102 of the second enclosure 90 thereby establishing a sealed engagement between the first and second enclosures 30, 90. The tubular sleeve 62 further engages the collar 122, thereby sliding the collar 122 toward the rear end 86 of the female coupling member 80. Likewise, the fixed piston rod 112 further engages the piston rod 50, thereby sliding the piston rod 50 toward the rear end 26 of the male coupling member 20. At all times during the engagement of the male coupling member 20 and the female coupling member 80, the piston rod 50 maintains a fixed position with respect to the piston rod 112, such that the front surface 55 of the piston head 54 lies in a second substantially common plane with the front surface 117 of the piston head 116. Similarly, at all times during the engagement of the male coupling member 20 and the female coupling member 80, the tubular sleeve 62 maintains a fixed position with respect to the collar 122, such that the front surface 63 of the tubular sleeve 62 lies in a third substantially common plane with the front surface 123 of the collar 122.

Fluid communication is prevented as long as either of the annular projection 124 of the collar 122 or the annular projection 68 of the tubular sleeve 62 is in contact with either of the elastic o-ring 58 in the slidable piston head 54 or the elastic o-ring 120 in the fixed piston head 116. Fluid communication is established when the collar 122 and the tubular sleeve 62 lie between the fixed piston head 116 and the rear end 86 of the female coupling member 80 such that the first passageway 33 and the second passageway 93 are not blocked thereby establishing the open position.

In order that the coupling members 20, 80 may be secured in the open position and not forced apart by the biasing forces of the first compression spring 70 and the second compression spring 128, the securing nut 140 is employed to securably attach the coupling members 20, 80. The projections 104 of the second enclosure 90 are first positioned at the rear ends of the long axial legs 148 of the L-shaped slots 146. The securing nut 140 is rotated with respect to the female coupling member 80 such that projections 104 travel along the circumferential legs 150 of the L-shaped slots 146 until the projections 104 arrive at the short axial legs 152 of the L-shaped slots 146. Once the projections 104 arrive at the short axial legs 152, the biasing force of the compression spring 154 will cause the washer 156 to engage the second enclosure 90, thereby retaining the projections 104 in the short axial legs 152, resulting in secure attachment of the male coupling member 20 and the female coupling member 80 in the open position.

When the male coupling member 20 and the female coupling member 80 are in the open position, fluid may flow through the apparatus 10 in either direction subject to the requirements of the particular application. By way of example, in an application where fluid is flowing from a location in a fluid transmission line attached to the male coupling member 20 and to a location in a fluid transmission line attached to the female coupling member 80, fluid would enter the rear end 26 of the male coupling member 20, the fluid would then flow through the guide 42, past the piston rod 50, past the fixed piston rod 112, past the guide 106 and then flow out of the rear end 86 of the female coupling member 80.

In use, the user connects a first fluid line to the rear end 26 of the male coupling member 20, and the user connects a second fluid line to the rear end 86 of the female coupling member 80. In order to connect the two fluid lines, the user presents the front end 24 of the male coupling member 20 to the front end 84 of the female coupling member 80 in the closed position. The user then rotates securing nut 140 so that the L-shaped slots 146 of the securing nut 140 are aligned with the projections 104 on the second enclosure 90. When the L-shaped slots 146 and the projections 104 are in alignment, the user moves the male coupling member 20 and the female coupling member 80 toward each other. Once the female coupling member 80 is fully inserted into the male coupling member 20, the user rotates the securing nut 140 such that the male coupling member 20 and the female coupling member 80 are securely attached to one another, thereby establishing the open position. In order to disconnect the two fluid lines, the user rotates the securing nut 140 and removes the female coupling member 80 from the male coupling member 20.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims. The scope is to be accorded the broadest interpretation so as to encompass all such modifications and equivalent structures as is permitted under the law.

What is claimed is:

1. A fluid line coupling apparatus comprising:
   a first enclosure having a first end and a second end wherein a first passageway extends between said first end and said second end;
   a first piston slidably disposed within said first enclosure and having a front surface, and said first piston movable between a closed position, wherein said first passageway is blocked by said first piston, and an open position, wherein said first passageway is not blocked by said first piston;
   a second enclosure having a first end and a second end wherein a second passageway extends between said first end and said second end of said second enclosure;
   a first collar slidably disposed within said second enclosure and having a front surface, and said first collar movable between a closed position, wherein said second passageway is blocked by said first collar, and an open position, wherein said second passageway is not blocked by said first collar; and
   said first enclosure engageable with said second enclosure wherein said front surface of said first piston and said front surface of said first collar lie in a substantially common plane when said first piston is in said closed position and said first collar is in said closed position.

2. The fluid line coupling apparatus of claim 1, said apparatus further comprising:
   said front surface of said first piston and said front surface of said first collar lying in different planes when said first piston is in said open position and said first collar is in said open position.

3. The fluid line coupling apparatus of claim 2, said apparatus further comprising:
   a second piston disposed within said second enclosure, and said second piston having a front surface and a fixed position with respect to said second enclosure.

4. The fluid line coupling apparatus of claim 3, said apparatus further comprising:
   a sleeve disposed within said first enclosure, and said sleeve having a front surface and a fixed position with respect to said first enclosure.

5. The fluid line coupling apparatus of claim 4, said apparatus further comprising:
   said front surface of said second piston lying in a substantially common plane with said front surface of said sleeve when said first piston is in said closed position and said first collar is in said closed position.

6. The fluid line coupling apparatus of claim 5, said apparatus further comprising:
   said second enclosure having at least one projection extending outwardly therefrom; and
   a second collar rotatably disposed circumferentially about said first enclosure, said second collar having at least one slot formed therein, wherein said at least one projection is engageable with said at least one slot to releasably attach said first enclosure and said second enclosure.

7. A quick disconnect fluid line coupling apparatus comprising:
   a first enclosure having a first passageway extending therethrough;
   a first substantially disc-shaped guide disposed within said first enclosure in a fixed position with respect thereto;
   a first piston disposed within said first enclosure, and said first piston having a stem and a head having an annular surface formed thereon, wherein said stem of said first piston is slidably connected to said first guide;
   a sleeve disposed within said first enclosure, and said sleeve having an annular surface;

a second enclosure having a second passageway extending therethrough;

a second substantially disc-shaped guide disposed within said second enclosure in a fixed position with respect thereto;

a second piston disposed within said second enclosure, and said second piston having a stem and a head having an annular surface formed thereon, wherein said stem of said second piston is fixedly connected to said second guide;

a collar slidably disposed within said second enclosure, and said collar having an annular surface;

said annular surface of said head of said first piston engages said annular surface of said sleeve, and said annular surface of said head of said second piston engages said annular surface of said collar to establish a first position;

said annular surface of said head of said second piston engages said annular surface of said sleeve to establish a second position; and said first passageway is in fluid communication with said second passageway to establish a third position.

8. The quick disconnect fluid line coupling apparatus of claim 7, said apparatus further comprising:

said head of said first piston having a front surface;

said sleeve having a front surface;

said head of said second piston having a front surface;

said collar having a front surface; and said front surface of said head of said first piston, said front surface of said sleeve, said front surface of said head of said second piston, and said front surface of said first collar lie in a substantially common plane in said first position.

9. The quick disconnect fluid line coupling apparatus of claim 8, said apparatus further comprising:

said front surface of said head of said first piston and said front surface of said first collar lying in different planes in said second position;

said front surface of said first piston lying in a substantially common plane with said front surface of said head of said second piston in said second position; and said front surface of said sleeve lying in a substantially common plane with said front surface of said first collar in said second position.

10. The quick disconnect fluid line coupling apparatus of claim 9, said apparatus further comprising:

said front surface of said head of said first piston and said front surface of said first collar lying in different planes in said third position;

said front surface of said head of said first piston lying in a substantially common plane with said front surface of said head of said second piston in said third position; and said front surface of said sleeve lying in a substantially common plane with said front surface of said first collar in said third position.

11. The quick disconnect fluid line coupling apparatus of claim 10, said apparatus further comprising:

said head of said first piston blocks said first passageway in said first position;

said first collar blocks said second passageway in said second position;

said head of said second piston blocks said first passageway in said second position; and said sleeve blocks said second passageway in said second position.

12. The quick disconnect fluid line coupling apparatus of claim 11, said apparatus further comprising:

said second enclosure having at least one projection extending outwardly therefrom; and a second collar rotatably disposed circumferentially about said first enclosure, said second collar having at least one slot formed therein, wherein said at least one projection is engageable with said at least one slot to releasably attach said first enclosure and said second enclosure.

13. A fluid line coupling apparatus comprising:

a first enclosure having a first end with an opening formed therein, and a second end attachable to a fluid transmission line, wherein a first passageway extends between said first end and said second end;

a sleeve disposed within said first enclosure, and said sleeve having a front surface proximal to said first end of said first enclosure;

a first piston having a front surface proximal to said first end of said first enclosure, and said first piston movable between a closed position, wherein said first piston sealingly engages said sleeve so that said first passageway is blocked by said first piston, and an open position, wherein said first piston does not engage said sleeve so that said first passageway is not blocked by said first piston;

a second enclosure having a first end with an opening formed therein, and a second end attachable to a fluid transmission line, wherein a second passageway extends between said first end and said second end;

a second piston disposed within said second enclosure, and said second piston having a front surface proximal to said first end of said second enclosure;

a first collar slidably disposed within said second enclosure, and said first collar having a front surface proximal to said first end of said second enclosure, and said first collar movable between a closed position, wherein said first collar sealingly engages said second piston so that said second passageway is blocked by said first collar, and an open position, wherein said first collar does not engage said second piston so that said second passageway is not blocked by said first collar;

said first enclosure engageable with said second enclosure to define an open position, wherein fluid may flow through said first passageway and said second passageway, and said front surface of said first piston lying in a substantially common plane with said front surface of said second piston, and said front surface of said sleeve lying in a substantially common plane with said front surface of said first collar; and said first enclosure engageable with said second enclosure to define a closed position wherein fluid may not flow through said first passageway and said second passageway, and said front surface of said first piston, said front surface of said sleeve, said front surface of said second piston, and said front surface of said first collar all lie in a substantially common plane.

14. The fluid line coupling apparatus of claim 13, said apparatus further comprising:

said first piston being biased toward said closed position; and said first collar being biased toward said closed position.

15. The fluid line coupling apparatus of claim 14, said apparatus further comprising:

said second enclosure having at least one projection extending outwardly therefrom; and a second collar rotatably disposed circumferentially about said first enclosure, said second collar having at least one slot formed therein, wherein said at least one projection is engageable with said at least one slot to releasably attach said first enclosure and said second enclosure.

\* \* \* \* \*

UNITED STATES PATENT AND TRADEMARK OFFICE
CERTIFICATE OF CORRECTION

| | | |
|---|---|---|
| PATENT NO. | : 7,401,626 B1 | Page 1 of 1 |
| APPLICATION NO. | : 10/991328 | |
| DATED | : July 22, 2008 | |
| INVENTOR(S) | : Plattner | |

It is certified that error appears in the above-identified patent and that said Letters Patent is hereby corrected as shown below:

In Col. 3, line 32, please delete "30" and insert -- 33 --.

Signed and Sealed this

Ninth Day of September, 2008

JON W. DUDAS
*Director of the United States Patent and Trademark Office*